Oct. 9, 1923.
C. F. FISHER
ANTISKID CHAIN
Filed Nov. 23, 1922
1,470,069
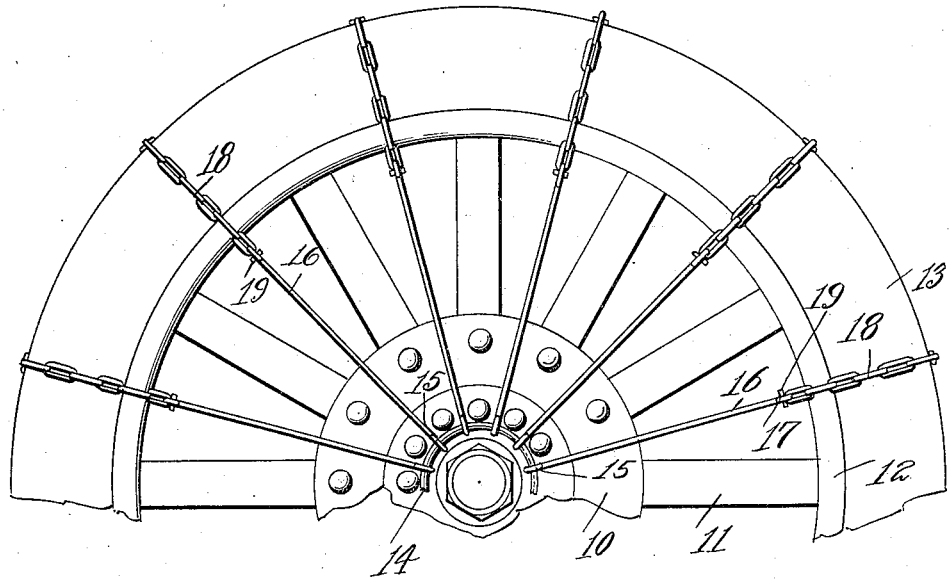
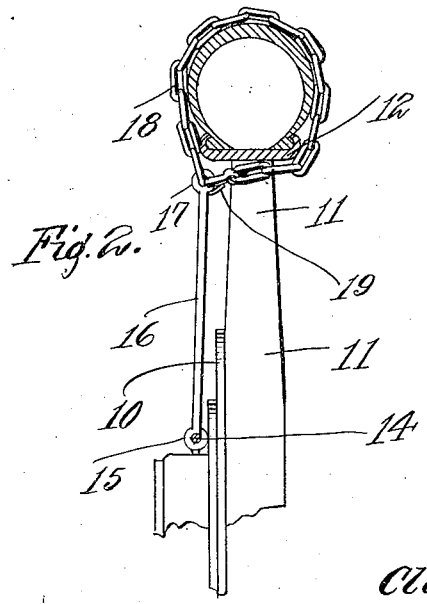
Inventor
Clarence F. Fisher
By Horace C. [signature]
Attorney Patented Oct. 9, 1923.

1,470,069

UNITED STATES PATENT OFFICE.

CLARENCE F. FISHER, OF LANCASTER, KANSAS.

ANTISKID CHAIN.

Application filed November 23, 1922. Serial No. 602,828.

*To all whom it may concern:*

Be it known that I, CLARENCE F. FISHER, a citizen of the United States, residing at Lancaster, in the county of Atchison, State of Kansas, have invented certain new and useful Improvements in Antiskid Chains; and I do hereby declare the following to be a full, clear, and exact description of the invention, such as will enable others skilled in the art to which it appertains to make and use the same.

This invention relates to new and useful improvements in anti-skid devices for vehicle wheels, and particularly to anti-skid chains for automobile wheels.

One object of the invention is to provide a novel and simple device which can be easily and quickly applied to a wheel, and which requires no specially constructed locks or means secured to parts of the wheel.

Another object is to provide a device of this character which is engaged with the hub of the wheel, and across the tread of the tire, and which will not be accidentally displaced, while at the same time, permitting free and loose movement on the tread of the tire.

Other objects and advantages will be apparent from the following description when taken in connection with the accompanying drawing.

In the drawing:

Figure 1 is an elevation of a portion of a wheel showing the invention applied thereto.

Figure 2 is a view taken at right angles to the view shown in Figure 1, with parts in section.

Referring particularly to the accompanying drawing, 10 represents the hub, 11 the spokes, 12 the rim, and 13 the tire of an automobile wheel, in connection with which the present invention is especially adapted for use.

Engaged around the outer portion of the hub 10 is a metal ring 14, and loosely engaged with the ring are the inner eye portions 15 of a number of radially extending rods 16, said rods being of a length to extend to points approximately one inch from the rim 12, where they are formed with the eye portion 17. Engaged with each of the eye portions 17 is one end of a length of chain 18, said chain being engaged across the tread of the tire, and around the rim, where it is terminally provided with a snap hook 19. This snap hook 19 is engaged with the outer eye portion 17, of the rod 16, as clearly seen in the drawing.

There is thus provided an anti-skid device which is simple in construction, formed from few parts, and one which can be manufactured at a low cost. Furthermore the device can be easily and quickly applied to any automobile wheel, or removed therefrom.

The chains 18 are of sufficient length to permit a loose play on the tread of the tire so that there will be no tendency to indent or cut the tire, while at the same time the ring 14 and rods 16 securely hold the chains in proper position on the wheel.

The ring 14 is slightly larger in diameter than the outer end of the hub so that it may be easily and quickly slipped thereon or slipped therefrom, and when not in use can be readily placed in the tool box, together with the rods and chains, occupying a small space. Furthermore, the device can be easily applied or removed without the use of a jack.

What is claimed is:

1. An anti-skid device comprising a ring, rods loosely connected with the ring, the outer end of each rod being formed with an eye, and chains each having one end permanently connected with one of the eyes, and having the other end detachably connected therewith.

2. The combination with an automobile wheel, of an anti-skid device therefor comprising a ring, rods having terminal eyes each having its inner eye loosely engaged with the ring, a chain terminally connected with the outer eye of each rod and engaged around the tire and rim of the wheel, and a hook on the free end of each chain for detachable engagement with the outer eye of a rod.

In testimony whereof, I have affixed my signature, in the presence of two witnesses.

CLARENCE F. FISHER.

Witnesses:
CARL H. HENRICHSON.
BRYAN SMITH.